Figure 1:
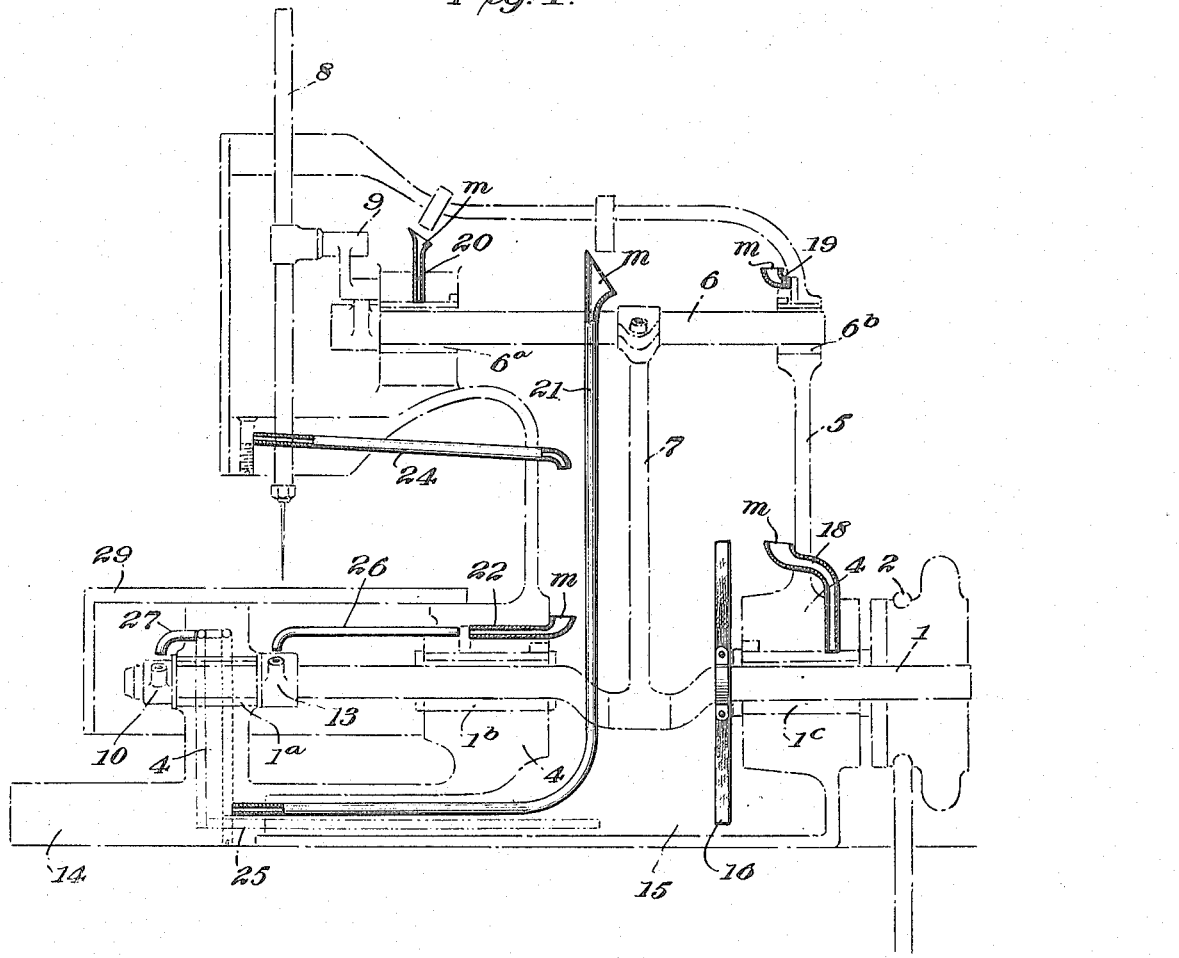

J. P. MARSHALL.
SELF LUBRICATING SEWING MACHINE.
APPLICATION FILED MAR. 17, 1913.

1,135,601.

Patented Apr. 13, 1915.
2 SHEETS—SHEET 1.

Witnesses:
J Adolph Bishop
O S Butler

Inventor:
John P. Marshall,
F. Cornwall.
Atty.

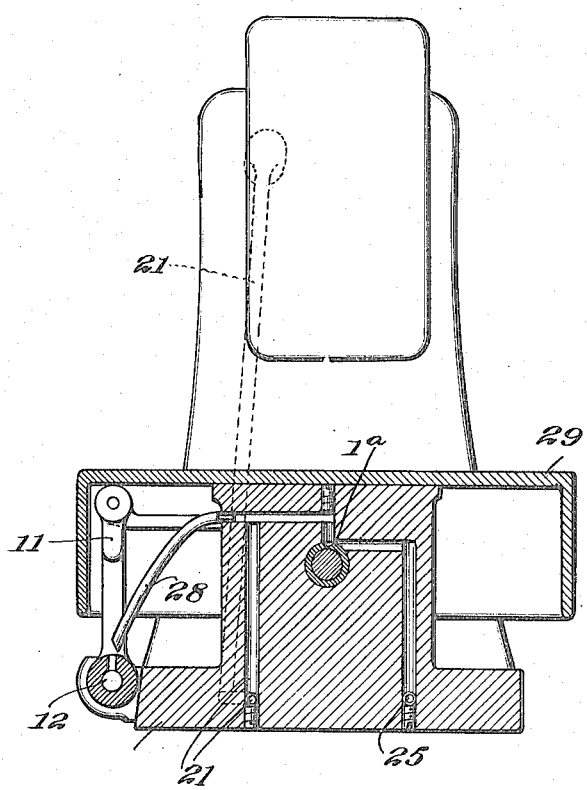

UNITED STATES PATENT OFFICE.

JOHN P. MARSHALL, OF ST. LOUIS, MISSOURI.

SELF-LUBRICATING SEWING-MACHINE.

1,135,601.

Specification of Letters Patent. Patented Apr. 13, 1915.

Application filed March 17, 1913. Serial No. 754,772.

*To all whom it may concern:*

Be it known that I, JOHN P. MARSHALL, a citizen of the United States, residing at city of St. Louis, State of Missouri, have invented a certain new and useful Improvement in Self-Lubricating Sewing-Machines, of which the following is a full, clear, and exact description, such as will enable others skilled in the art to which it appertains to make and use the same, reference being had to the accompanying drawings, forming part of this specification, in which—

Figure 1 is a side elevation of a sewing machine illustrating my invention. Fig. 2 is an end elevation partly in section. Fig. 3 is an enlarged cross sectional detail of a bearing.

My invention relates broadly to sewing machines and more specifically to a special construction of a machine casing whereby the various working parts are constantly lubricated while the machine is in operation.

My invention is designed particularly for power operated machines, such as are used in factories, and which are run at a very high speed. In such machines, which are run at a speed between 2500 and 3500 revolutions per minute, the lubrication of the various working parts is a very important consideration, as the high speed operation makes overheating of the bearings very easy. As such machines are generally operated by girls who are paid by the amount of work turned out, they are as a rule lubricated very infrequently and irregularly, and when they are oiled by the operators, a surfeit of oil is usually applied, which results in an expensive waste.

My invention is designed to obviate the necessity of the operators giving any attention whatever to lubrication of the machine, and at the same time secure a complete lubrication of all the working parts and positively prevent the waste of oil.

In the drawings, 1 represent the main shaft of the machine which is operated by the belt 2. The main shaft is carried in three bearings, $1^a$, $1^b$, $1^c$, which are carried in housings 4 specially formed in the casing 5. The rock shaft 6 is carried in bearings $6^a$ and $6^b$, and is operated from the main shaft by connecting rod 7. Needle bar 8 is operated from the rock shaft 6 by the intermediate mechanism 9. Eccentrics 10 and 13 are carried on the main shaft 1 and operate the feed vibrating mechanism 11 mounted on the bearing 12.

The base 14 of the machine casing is provided with an oil well 15 which is adapted to contain the lubricating oil. A splasher 16 carried by the main shaft 1 operates in the oil contained in the well 15 and when the machine is running throws the oil in a fine spray throughout the entire casing of the machine. This serves to lubricate all of the free working parts, such as the mechanism 9, but does not reach the shaft bearings.

The bearings as illustrated in Fig. 3 are in the form of substantially cylindrical bushings which are provided at their upper sides with the groove 17 in which is placed a shred of sponge or waste. To properly supply these bearings with oil, I supply the machine casing with the oil conduits 18, 19, 20, 21 and 22. These oil conduits have upwardly directed openings M positioned within the machine casing and serve to accumulate oil which is delivered to them in the form of spray by the splasher 16. These conduits conduct the oil to the sponge contained in the groove 17 of the bearings. The conduits 18, 19, 20 and 22 are comparatively short and lead directly to the bearings. Conduit 21, however, which oils the front bearing $1^a$ is quite long, passing downward within the machine casing and then forward through the base portion and upward to the bearing. Because of the height of the upright portion of the conduit 21 within the machine casing, a pressure head is formed which serves to force the oil to the bearing $1^a$.

To insure against oil escaping from the outer bearings and soiling the work, means is provided for conducting the superfluous oil back to the oil well 15. This means comprises the conduits 24, which leads back from the head of the machine to within the casing, and 25, which leads from the bearing $1^a$ back through the base of the machine to the oil well 15.

Lubricant is conveyed to outer working parts by the discharge conduits 26, 27 and 28. The last two mentioned carry lubricant from conduit 21 to bearings 10 and 12 respectively, and the first mentioned carries superfluous oil from bearing $1^b$ to bearing 13. The amount of oil which may be supplied through these last named conduits may be regulated by placing in them bits of sponge.

By virtue of this oiling arrangement, the work table 29 may be made imperforate and the working parts thereby protected from the access of lint or dust. Moreover, there is no waste of lubricant, as all surplus oil is returned to the oil well and may be used repeatedly. Moreover, as above indicated, the working parts are absolutely insured against heating as the operation of running the machine serves to lubricate all of the working parts.

I am aware that my invention may be incorporated in forms other than that illustrated, and I therefore do not intend that it be limited to the specific form shown but that it be construed to include all obvious modifications.

What I claim to be my invention and desire to secure by Letters Patent is:

1. In a machine having a housing for inclosing working parts, and bearings disposed externally thereof, an oil-collecting device disposed within said housing above the level of said bearings, an oil well formed in said housing, an oil conduit communicating with said oil-collecting device and said oil well, discharge conduits leading from said oil conduit to said bearings, and means operable within said housing for distributing oil from said oil well to said collecting device.

2. In a machine having a housing for inclosing working parts, and a bearing exterior thereof, a collecting receptacle disposed within said housing above the level of the said bearing, an oil well formed within said housing, an oil conduit leading from said receptacle through the base of the machine below said bearing, and through the base of the machine to said oil well, said conduit having communication with said bearing, and means operable within said housing for distributing oil from said oil well to said receptacle.

In testimony whereof I hereunto affix my signature in the presence of two witnesses, this 15th day of March, 1913.

JOHN P. MARSHALL.

Witnesses:
M. P. SMITH,
M. A. HANDEL.